US011328081B2

(12) United States Patent
Upadhyay et al.

(10) Patent No.: US 11,328,081 B2
(45) Date of Patent: May 10, 2022

(54) CONSENT-BASED DATA PRIVACY MANAGEMENT SYSTEM

(71) Applicant: SAP SE, Walldorf (DE)

(72) Inventors: Vivekkumar Upadhyay, Mumbai (IN); Tenzin Choegyen, Bir (IN)

(73) Assignee: SAP SE, Walldorf (DE)

( * ) Notice: Subject to any disclaimer, the term of this patent is extended or adjusted under 35 U.S.C. 154(b) by 193 days.

(21) Appl. No.: 16/162,235

(22) Filed: Oct. 16, 2018

(65) Prior Publication Data
US 2020/0117824 A1    Apr. 16, 2020

(51) Int. Cl.
*G06F 21/00* (2013.01)
*G06F 21/62* (2013.01)
*G06F 16/22* (2019.01)
*G06F 16/25* (2019.01)

(52) U.S. Cl.
CPC ........ *G06F 21/6227* (2013.01); *G06F 16/221* (2019.01); *G06F 16/258* (2019.01); *G06F 2221/2141* (2013.01)

(58) Field of Classification Search
CPC ......... G06F 21/6227; G06F 2221/2141; G06F 16/221; G06F 16/258
See application file for complete search history.

(56) References Cited

U.S. PATENT DOCUMENTS

| 2005/0105719 | A1  | 5/2005  | Hada |
|---|---|---|---|
| 2014/0373182 | A1* | 12/2014 | Peri ..................... G06F 21/6245 726/30 |
| 2016/0070758 | A1* | 3/2016  | Thomson ............... G16H 10/60 707/781 |
| 2016/0283558 | A1  | 9/2016  | Wu et al. |
| 2017/0083604 | A1* | 3/2017  | Syed-Ebrahim .... G06F 21/6227 |
| 2017/0344749 | A1  | 11/2017 | Yang et al. |
| 2017/0364555 | A1* | 12/2017 | Sirigireddy ....... G06F 16/24534 |
| 2018/0048650 | A1  | 2/2018  | Decouteau et al. |
| 2019/0156053 | A1* | 5/2019  | Vogel .................. G06F 21/6245 |
| 2019/0197174 | A1* | 6/2019  | Kim ...................... G06F 16/258 |

FOREIGN PATENT DOCUMENTS

EP    1 089 196    4/2001

OTHER PUBLICATIONS

Partial European Search Report, dated Dec. 11, 2019, for European Patent Application No. 19194878.5, 13 pages.
Extended European Search Report, dated Mar. 9, 2020, for European Patent Application No. 19194878.5, 13 pages.

* cited by examiner

*Primary Examiner* — Joseph P Hirl
*Assistant Examiner* — Chi D Nguy
(74) *Attorney, Agent, or Firm* — Klarquist Sparkman, LLP

(57) ABSTRACT

For example, a data set comprising a plurality of data fields, including at least one field containing personal information, can be received. Meta-information for the data set can be reviewed, which includes a categorization for the data set comprising a first parameter specifying field data type, and, for fields comprising personal information, a second parameter specifying personal data consent information. The data set may be converted into a columnar data storage format using the meta-information, and the at least one data field comprising personal information may be stored in at least one column marked as comprising personal information, and at least one personal information privacy control may be applied to the at least one marked column.

16 Claims, 10 Drawing Sheets

CONSENT-BASED DATA PRIVACY MANAGEMENT SYSTEM

FIELD

The present disclosure generally relates to data management, and more particularly to optimizing procedures and structures for managing and ensuring privacy of stored data.

BACKGROUND

Business applications need to comply with various data privacy regulations to protect the data, particularly personal data, received from individuals doing business with a given entity that collects this data, such as a business.

For example, recently the European Union (EU) has set up the General Data Protection Regulation (GDPR) in an effort to strengthen and unify data protection for all individuals within the EU. GDPR changes how personal data can be used and processed by businesses and public-sector organizations. The data protection requirements of the GDPR have four main components: Discovery, Management, Protection and Reporting.

The discovery process is an initial step to identify all characteristics of the personal data that must be managed under GDPR compliance. This requires extensive exploration of the dataset to identify personal data and understand what legal rights have been given for an entity receiving a given data subject's personal data to use the data.

Once a given data subject's personal data is identified, it can then be secured and governed. This requires applying different policies to the data in various forms and stages. In order to accomplish the required objective, organizations should adopt a privacy-by-design approach to data protection. GDPR specifically calls out encryption as a security requirement. Securing and governing the data requires a number of critical capabilities including encryption and masking, access control management and recovery management, among others.

One of the critical aspects of GDPR is that an organization must obtain explicit consent for personal data collection from a data subject—so called "consent by default" is no longer valid. According to GDPR, processing of data should be based on express consent from a data subject, and that data subject must be provided clear information on how that data will be used, for how long it will be retained, and how it will be shared with third parties.

Even for personal data for which consent has been given, organizations should delete a data subject's personal data and any corresponding data created due to various business process, once there is no longer a valid reason to maintain the data.

There are two primary aspects of data deletion:

First, according to article 17 of the GDPR, a data subject has "the right to erasure". This gives an individual the right to have his or her personal data erased and no longer processed when there is no compelling purpose for its continued processing by an organization.

Second, an organization should provide for automatic deletion of a data subject's personal data when they are no valid legal grounds for the continued processing or storing of that data, either due to the expiration of some legal term (e.g., the term for which tax records must be retained), or due to the specific withdrawal of consent by the user.

GDPR guidelines apply not only to a natural person's own data, but also to any related artifacts generated during the data analytics lifecycle. Each of these aspects, too, must be managed, tracked and reported.

Finally, in cases where there is a security breach that affects or potentially affects protected personal data, organizations are required to notify both the data subjects and the appropriate supervisory authority governing the organization.

Therefore, a need exists for systems that improve the ability of organizations to identify and safeguard personal information, and to segregate personal information to which a given set of personal information safeguards apply from other information to which different personal information safeguards or no personal information safeguards may apply.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for providing consent-based data privacy management of personal information.

For example, in one embodiment, a computer-implemented method comprises: receiving a data set comprising a plurality of data fields, wherein at least one data field comprises personal information, and further wherein at least one data field does not comprise personal information; reviewing meta-information for the data set, the meta-information comprising a categorization for the plurality of fields, the categorization comprising, for each of the plurality of fields: a first parameter specifying field data type, and for fields comprising personal information, a second parameter specifying personal data consent information; converting the first data set into a columnar data storage format using the meta-information, wherein converting the first data set further comprises storing the at least one data field comprising personal information in a column marked as comprising personal information; and applying at least one personal information privacy control to the at least one marked column.

In another embodiment, A computing system comprises: one or more memories; one or more processors coupled to the one or more memories; and one or more non-transitory computer readable storage media storing instructions that, when executed, cause the one or more processors to perform the following operations: receive a data set comprising a plurality of data fields, each having a plurality of entries, wherein at least one data field comprises personal information, and further wherein at least one data field does not comprise personal information; review meta-information for the data set, the meta-information comprising a categorization for the plurality of fields, the categorization comprising, for each of the plurality of fields: a first parameter specifying a data type, and for fields comprising personal information, a second parameter specifying personal information consent information, the second parameter comprising: a personal information identifier, and at least one personal information consent type specifying a usage purpose for which a data subject may provide consent; convert the first data set into a columnar data storage format using the meta-information, wherein converting the first data set further comprises storing the plurality of entries for the at least one data field comprising personal information in a column marked with the personal information identifier; and apply at least one personal information privacy control to the at least one column marked with the personal information identifier.

In still another embodiment, a computer-implemented method comprises: receiving a query for data for at least one of a plurality of data subjects, wherein the data comprises a plurality of data fields stored in a columnar format, and wherein at least one data field is stored in a column that is marked as comprising personal information; reviewing the data set to determine, for the at least one data subject, if a valid consent has been provided for the personal information stored in the marked column; determining whether the valid consent has been provided for the at least one data subject, and if the valid consent has been provided: include the personal information in a query result, and return the query result including the personal information stored in the marked column; and if the valid consent has not been provided: do not include the personal information in a query result, and return the query result excluding the personal information stored in the marked column.

As described herein, a variety of other features and advantages can be incorporated into the technologies as desired.

The foregoing and other objects, features, and advantages of the invention will become more apparent from the following detailed description, which proceeds with reference to the accompanying figures.

DETAILED DESCRIPTION

Overview

Figure 1:
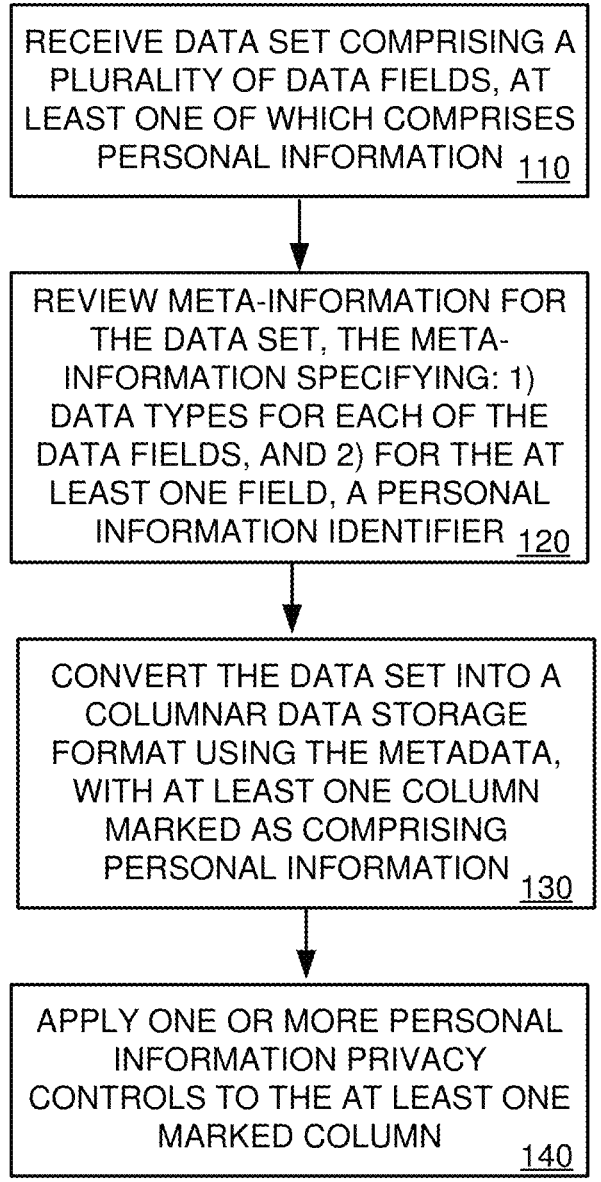
FIG. 1 is a flowchart of an example method for implementing consent-based data privacy management.

As described herein, various techniques and solutions can be applied for providing consent-based data privacy management of data subjects' personal information.

In one example, a user may wish to purchase a book, such as from an online retailer, and in so doing may also wish to create an account with the retailer, such as for the purpose of facilitating future purchases or receiving additional information from the retailer.

The retailer in this scenario might collect information, such as a user's name, email address, physical address, date of birth, and phone number, and additional information, such as an order ID or transaction ID may also be generated. Some of this information would be considered "personal information," giving rise to personal data storage considerations, while other aspects, such as an order ID or transaction ID, may not. In existing approaches, all information associated with a given transaction may be stored together in a single data file. While this may facilitate obtaining all information about a given order, it does not provide a facility for segregating personal data from other non-personal transactional data. As such, existing approaches to data storage may provide inadequate resources for data governance and protection, and may be inadequate to meet requirements of, e.g., the GDPR or similar regulations.

This disclosure sets forth computer-implemented methods and apparatus for providing consent-based management of personal data, by providing the ability to separately store and manage personal data from other types of data (e.g., transactional data). In some embodiments, it may be possible to identify multiple types of consent for a given data type, so that a given data type may be processed in accordance with the specific consent(s) provided by a data subject for his or her personal data. In some embodiments, legal entities that govern the provided consents may be specified, so that, e.g., specific rules for managing personal data in a given jurisdiction can be applied to personal data obtained from data subjects in that jurisdiction. In certain embodiments, multiple rule sets may be applied to a given data type, reflecting the different consents and/or legal entities governing the processing and management of personal data having that data type.

In one example, an input interface is provided to accept data from a data subject. This interface may accept a data subject's name, email address, address, date of birth and phone number, and/or other information. As part of this process, a data subject ID may be assigned to the data subject to facilitate tracking the various personal data consents for that data subject. An exemplary data set for a purchase made by a data subject, Joy Rayn, is set forth below:

Exemplary Data Set:

| DataSubject ID | Name | Email-Id | Address | DOB | Ph. no | Order ID | Transaction ID |
|---|---|---|---|---|---|---|---|
| Ix231243 | Joy Rayn | jr@xyz.com | 43 Flower St. Berlin, DE | May 6, 1981 | 241-555-1111 | 21451 | 1452-6578-12 |

Now, as mentioned above, the data subject may be asked to provide consent for use of her personal data for different business purposes, each of which may have different requirements associated therewith. In this case, the data subject Joy Rayn, associated with a unique DataSubject ID that identifies her (in this case "Ix231243") has provided her consent to use certain personal data for sales purposes, such as for management in a customer relationship management (CRM) application, while she has provided separate consent for use of a different set of personal data for marketing purposes, such as perhaps a monthly newsletter subscription managed by the marketing department. These various consents may be stored, e.g., in a data subject consent table, an example of which is illustrated below, which specifies the specific data types for a given data subject, as well as the consent types associated with each.

Exemplary Data Subject Consent Table:

| DataSubject ID | Data | Consent type |
| --- | --- | --- |
| Ix231243 | Name | [sales, marketing] |
| Ix231243 | Email-Id | [sales, marketing] |
| Ix231243 | Address | [sales] |
| Ix231243 | DOB | [sales] |
| Ix231243 | Ph. No | [sales, marketing] |

In the exemplary data subject table shown above, then sales consent has been provided for the data subject's name, email address, address, date of birth, and phone number, while marketing consent has been provided solely for name, email address and phone number. Because Order ID and Transaction ID shown in the data table are not considered personal information, no specific data subject consent may be required for managing those datum, and so they are not provided in the data subject consent table.

Each of the various consents provided by a data subject may be governed by one or more legal entities, which may carry requirements for how certain data types and/or consent types may be managed. The legal entities governing specific consent types may be set forth in a legal entity table, an example of which is provided below.

Exemplary Legal Entity Table:

| DataSubject ID | Consent-type | Legal Entity |
| --- | --- | --- |
| Ix231243 | Sales | DE |
| Ix231243 | Marketing | DE |

In the illustrated embodiment, both the sales and marketing consents are governed by legal entity DE (representing Germany, which is the data subject's place of residence in the example above), but it is to be understood that different legal entities could be listed for different consent types and/or multiple jurisdictions could be listed for a given consent type.

Additionally, for each legal entity, specific rules may be established governing not only how long data may be stored for given types of consent, but what type of access may be provided to the data. These rules may be set forth in a rule table, an example of which is provided below.

Exemplary Rule Table:

| Consent | Legal Entity | Blocking Period | Retention Period |
| --- | --- | --- | --- |
| Marketing | DE | 4 years | 6 years |
| Sales | DE | 3 years | 5 years |

In the illustrated example, marketing data, governed by legal entity DE, may be subject to both a blocking period and a retention period. A blocking period may specify, for example, a period after which access to certain data may be restricted for the specified consent type. For example, in the illustrated embodiment, a blocking period is established such that marketing data may only be accessed by the marketing department (or others with access to data for which a marketing consent has been provided) for a period of 4 years, after which their access may be restricted, as further described herein. A separate retention period is established however, since there may be reasons for which data must be retained for a period that is longer than the blocking period, such as for tax purposes, auditing purposes, or other purposes permitted in or specified by a given legal entity or jurisdiction.

So, in the illustrated example, marketing data may be retained for a period of 6 years, while sales data may only be retained for a period of 5 years. So, according to the rule table, 5 years after completion of a business transaction with the data subject in which personal data is collected subject to a sales consent, personal data collected solely for the sales purpose (such as, in the example above, a data subject's date of birth) should be deleted, e.g., from a CRM application. However, data for which a data subject has provided both marketing and sales consents (e.g., an email address) may not be deleted until the end of 6 years, the end of the marketing consent retention period. Similarly, the marketing department may continue to have access to a data subject's email ID based on the marketing consent for 4 years, even if the sales department only had access for the first 3 years based on the sales consent.

As further described herein, this combination of segregating personal and non-personal data types and integrating consent with the various data types may be accomplished by mapping consent at a "column level," such as by utilizing the column-based properties of the Apache Parquet data storage format. This column-based approach helps to segregate personal data for compliance with personal data management and deletion requirements, while still storing data in accordance with traditional business processes.

Figure 10:
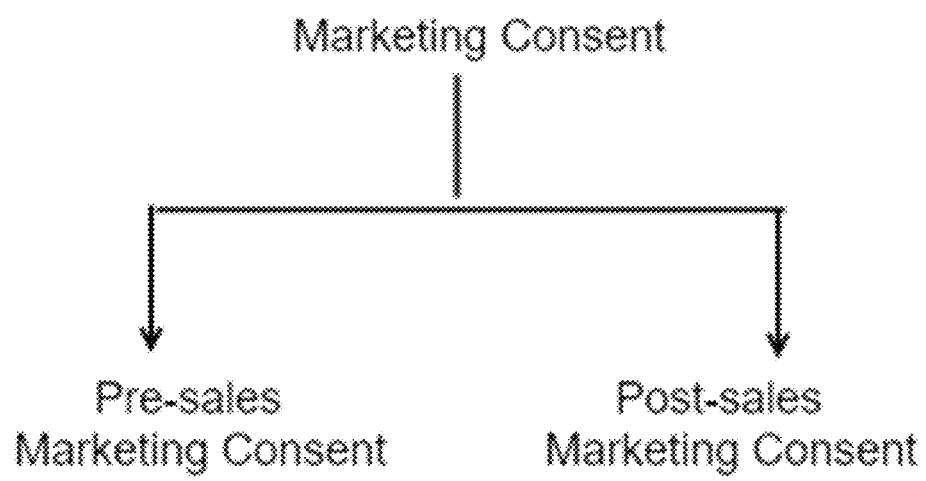
FIG. 10 is a diagram depicting exemplary consent subcategories.

Additionally, in some embodiments, consent sub-types may be established, so that, for example, a user may provide marketing consent for certain data types to be used prior to a sale, and, in some instances, for only certain data to be used after a sale, as illustrated in FIG. 10.

For example, a user might give consent that her phone number may be used for the purposes of contacting her about a problem with a shipment of a product she has ordered, but not for purposes of contacting her thereafter. In such a case, her phone number might carry a pre-sales marketing consent, but not a post-sales marketing consent.

Example Method for Consent-Based Data Privacy Management

FIG. 1 is a flowchart of an example method 100 for consent-based data privacy management. The example method 100 can be performed, at least in part, by a computing device.

At 110, a data set is received that contains a plurality of data fields, wherein at least one data field comprises personal information and at least one data field does not comprise personal information.

At 120, meta-information for the data set is reviewed, the meta-information specifying data types for each of the data fields, and for the at least one field comprising personal information, also specifying a personal information identifier. For example, the meta information may comprise a categorization for the plurality of fields, the categorization comprising, for each of the plurality of fields: a first parameter specifying field data type, and, for fields comprising personal information, a second parameter specifying personal data consent information.

An exemplary set of meta-information for a data set is set forth below, with personal data identifiers "@PDI" associated with each of the data types that comprise personal information, though it is to be understood that different types of identifiers could be used:

Example Input Metadata:

```
{
    @PDI // Personal data identifier
    DataSubject ID,
    @PDI
    Name,
    @PDI
    Email-Id,
    @PDI
    Address,
    @PDI
    DOB,
    @PDI
    Contact number,
    Order Id,
    Transaction Id
}
```

At 130, the data set is converted into a columnar data storage format using the meta-information, and at least one column is marked as comprising personal information. For example, a given column may be marked with a personal data identifier. Additionally, a given column may be marked with one or more consent identifiers identifying specific consents provided by a data subject for their personal data. Additionally, a given column may be marked with one or more legal entity identifiers identifying specific legal entities governing consents for a given data type and/or for a given data subject. In some embodiments, the conversion may be performed using a micro-service Parquet writer to convert the data into Parquet file format. In particular embodiments, the data may be stored in business object relationship format. As further described herein, the Parquet writer may make use of "PII identifier" and "consent monitoring and management" modules for personal data marking.

An exemplary data model that may be used to store data so that the one or more columns comprising personal information may be marked is set forth below. A first parameter may be specified in the data model which may comprises a data type, such as Name, Email-Id, etc. A second parameter may also be specified for some or all of the data types in the data model, which may contain one or more of: personal data identifiers (e.g., "@PDI"), one or more consent identifiers (e.g., "sales," "marketing"), one or more legal entity identifiers (e.g., "DE") added to the data field for each of the data types comprising personal information, and/or other identifiers as may be desired. Again, it is to be understood that these identifiers are only exemplary, and that different identifiers or other forms of identification could be used to identify personal data, consent types, legal entity types, etc.

Example Data Model:

```
→DataSubject ID
→Name- {sales, marketing, DE, @PDI}
→Email-Id- {sales, marketing, DE, @PDI}
→Address- {sales, DE, @PDI}
→DOB- {sales, DE, @PDI}
→Contact number- {sales, marketing, DE, @PDI}
→ Order Id
→ Transaction Id
```

In particular embodiments, as further described herein, a "PII identifier" module may be used to identify data fields containing personally identifiable information about a data subject, such as name, email address, date of birth, etc. Once the data types comprising a data subject's personal data are identified, tagging can be applied to specify the consent types and/or legal entities types for each data type, which are then associated with that stored data. For data stored in a columnar format, then, a module, such as a "consent monitoring and management module" described further herein may map these contents to each column, instead of mapping consent at a file level.

At 140, one or more personal information privacy controls are applied to the at least one marked column. Exemplary privacy controls are discussed in more detail below, and may include, for example, and without limitation: encrypting the data, masking the data, blocking access to the data, and/or deleting the data. Again, because data is stored in a columnar format, these privacy controls can be applied to individual data types based on their specific consents associated therewith, rather than at a file level, which in some cases either may not comply with legal entity requirements or may unduly limit access to certain types of information, or both.

Example System for Consent-Based Data Privacy Management

Figure 2:
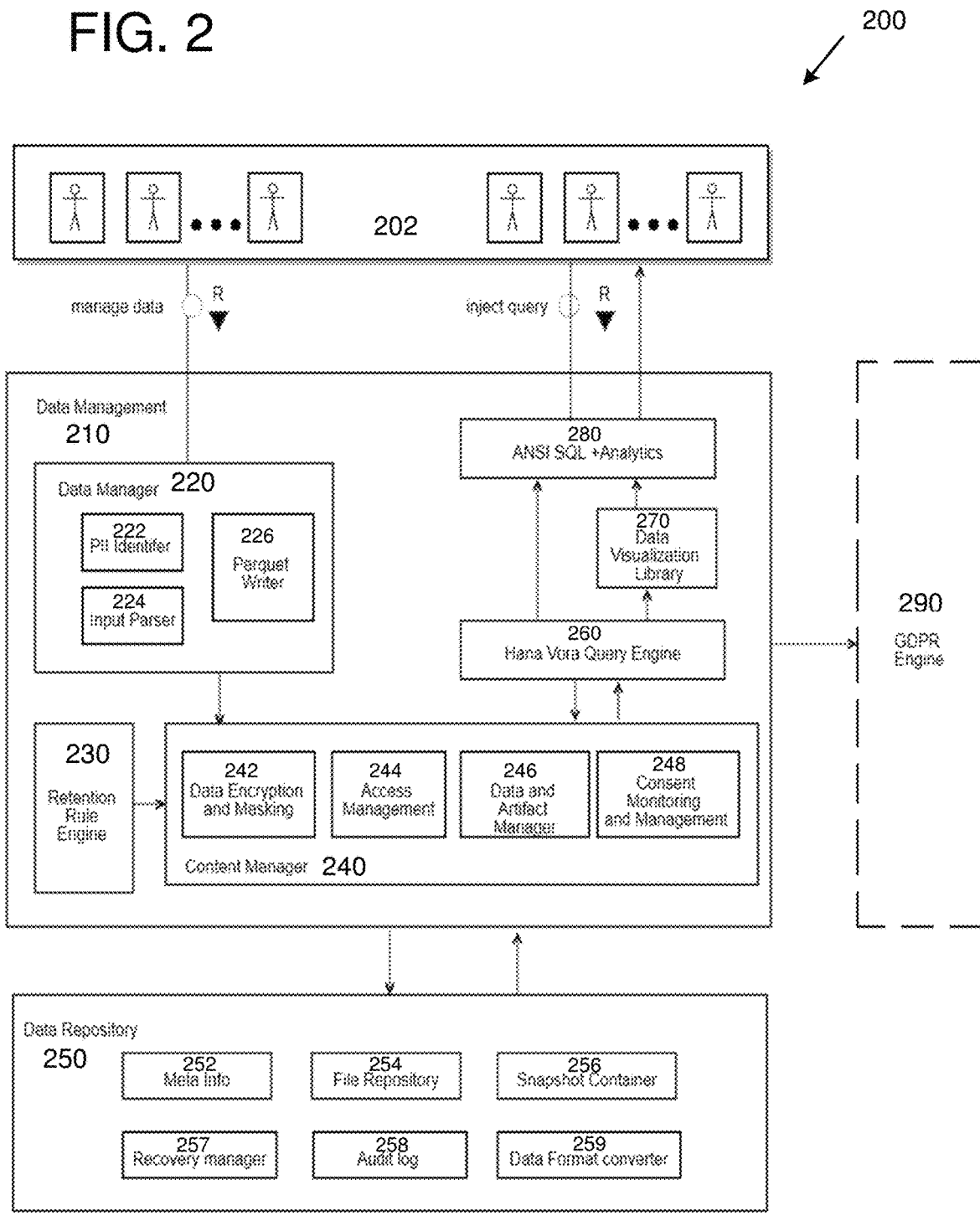
FIG. 2 is block diagram of an example system implementing consent-based data privacy management.

FIG. 2 is a block diagram of an example computing system 200 implementing consent-based data privacy management. The computing system 200 is not intended to suggest any limitation as to scope of use or functionality, as the technologies may be implemented in diverse general-purpose or special-purpose computing systems. The system can include, e.g., computing devices (e.g., server computers, desktop computers, database systems, and/or other types of computing devices) and/or software resources supporting the receipt, storage, management, and deletion of data, particularly data that includes personal information.

With reference to FIG. 2, the computing system 200 may include an input interface 202 that may be utilized by one or more users to interact with a data management sub-system 210, a data repository 250, and, in particular embodiments, a GDPR Engine 290.

The input interface 202 may be configured to receive one or both of: a) data from a data subject (such as an individual) that is to be stored and managed by the system and b) corresponding meta-information about how that data—and in particular any personal information contained within that data—is to be handled by the system. In some embodiments, this data may be obtained directly from a data subject, while in other embodiments, it may be received by the input interface 202 in a file containing the required information. For example, a first file may be received that contains meta-information for how data in one or more data sets to be received by the input interface 202 is to be handled, as further discussed herein. A second file may then be received which contains the data set(s) itself. In particular embodiments, the meta-information for a given data set is received prior to receiving the data set, so that the information regarding, e.g., personal information that may be identified within the data set has already been provided when the data set is received.

The data management sub-system 210 comprises a data manager 220, a retention rules engine 230, a content manager 240, and may also contain a query engine 260, data visualization library 270, and a SQL query and analytics processor 280.

The data manager 220 is responsible for receiving data to be managed and formatting it properly so that personal information contained therein may be properly stored and managed. The data manager may comprise a personal information identifier (PII) 222, an input parser 224, and a columnar format writer, such as a Parquet writer 226. The personal information identifier 222 is a module that interprets which of the fields in a given data set comprise personal information, so that these can be properly segregated, stored, and managed separately from fields that do not contain personal data. The input parser 224 is responsible for recognizing the various annotations that may be used to identify specific types of data, and, in particular, personal data within the data set. So, for example, while in the example given above "@PDI" was used as an identifier for personal information, for a given transaction or set of transactions, additional or alternative identifiers might be introduced within the meta-information associated therewith to identify personal data. The input parser is also responsible for mapping the master data, which is then processed by a columnar format writer, such as a Parquet writer 226 and stored in a columnar format in the data repository 250.

As discussed above, some jurisdictions require automatic deletion of data subjects and/or their corresponding data when there is no longer a valid reason for processing or storing that data. Additionally, a business may wish to delete this data for business reasons, to free up storage, or for other reasons. The retention rules engine 230 may facilitate this process by providing a facility for an application or system to set rules at consent level. So, in the example discussed above, the retention rules engine might set a rule providing that "if personal data for which a marketing consent was obtained in Germany has been stored for 6 years, automatically delete." Alternatively, a discretionary rule could be established. For example, a rule could be provided that sends a prompt to an administrator regarding data that has been stored for a given threshold to determine whether it should be deleted, such as, a rule that states "if Marketing data has not been accessed for 5 years, prompt for possible deletion." Such a rule might be useful in a case where, while it is legally permissible to retain data for a longer period, a business might want the flexibility to delete certain types of data sooner. These rules may be stored in the data repository 250, described in further detail below, or in another suitable location. In some embodiments, a workflow scheduler (not pictured), such as the Oozie Workflow Scheduler for Hadoop, may be provided to work in concert with the retention rules engine 230 to periodically run and detect the data which need to be blocked or erased based on the rule. Since personal data in the system is tightly coupled with the consents governing it, this may significantly reduce the processing overhead for managing and executing retention rules and other personal information privacy controls, versus prior systems which did not provide for column-based or field-based consent handling.

In some embodiments, the retention rules engine 230 may be used to check data as it is saved into the data repository 250 to determine how long the given data, or certain fields or columns of data, should be retained, or how long before access to them may be blocked for one or more purposes or consent types, as further described below. Then, the retention rules engine 230 may be used to track the date after which the handling of the data should be adjusted. For example, a given subset of data with a given consent may be set to have its retention date expire on Oct. 20, 2020. At this point, the retention rule engine could provide a rule for that data to be deleted automatically, or it could provide, e.g., an alert to a responsible individual, or to a responsible data management subsystem that on Oct. 20, 2020, the retention period has expired. This functionality could be used to provide a user or system with, for example, a list of action items that are due on a given day or during a given time period. Among these action items might be a list of, e.g., personal data fields that are expired, and so should be deleted from the system. This generation of the list of action items may be based on the retention rules engine 230 that was used when the data in question was transferred from the input interface 202 to the data repository 250. Based on the meta-information for this data and the corresponding rules provided by the retention rules engine 230, the "action item" list may be generated and forwarded to another process for managing this data, or, e.g., to an individual, such as a data controller, administrator, data privacy specialist officer, or other responsible individual, who may then be prompted to provide authorization to delete the data, or in some cases, to continue to maintain the data, such as for an additional period. So, retention rules engine 230 may be used to facilitate an automatic process, such as automatic data deletion, or a manual process, such as prompting a user to review data that may be subject to, e.g., data deletion or access control changes, and permitting a responsible individual to make a decision as to whether to authorize the deletion or access control change. Access control is further discussed below.

The content manager 240 provides a number of components which may be used to manage the data to provide a privacy-by-design approach both to introducing data into the system, e.g., as it is transferred into the data repository 250, and thereafter for as long as the data is retained. The content manager may include 240 a data encryption and masking module 242, an access management module 244, a data and artifact manager 246, and a consent monitoring and management module 248.

The data encryption and masking module 242 takes the data that has been converted into columnar file format in the data manger 220 and encrypts the particular columns of data, for which encryption is either required or desired. So, for example, a given legal entity may require identified personal data to be encrypted before storing it. This module permits encryption to be applied selectively, such as only to those columns that are identified as comprising personal data, while not encrypting other columns of data, such as those that do not contain personal information. Alternatively, all columns may be encrypted.

Additionally, this module may provide for data "masking," so that data which should only be accessible by certain individuals or for certain purposes is "masked" as to those individuals or purposes for which consent has not been given. For example, a data type, such as a data subject's address, for which a sales consent has been obtained may be stored in the data repository, but this data should be "masked" as to those individuals or processes that try to utilize the data for another purpose besides the consented sales purposes. For example, if a marketing consent has not been provided, use for a marketing purpose, or perhaps by an individual operating in the marketing department, should be "masked" so that access to these non-authorized individuals or for these non-authorized purposes, is restricted.

The access management module 244 may be configured to determine what data can be seen and by whom, both initially, and as data is transformed throughout the analytic process. For example, this module may be used to manage or enforce access control lists or other policies established by an application that consumes data managed by the system, by which access may be restricted to certain departments, certain users within departments, or those having particular job responsibilities. So, if data is "masked" so that marketing personnel cannot access it, or so that it cannot be accessed for marketing purposes, this module may present access for those individuals, or for those purposes. Similarly, after a blocking period has expired, access to a document may be blocked to all users, or to all users except a limited set, such as auditors or other individuals required to access the data for specific purposes within the business. This may permit access to data that otherwise might be blocked, but for which certain identified individuals may have legitimate business or legal purposes that require them to have access. This module may also be used to manage access for given purposes, which may change after data is first entered into the system, such as when consent for using a given data type for a given business purpose expires. So, for example, where a data subject has provided "pre-sales consent" for certain types of data, but has not provided "post-sales consent," the access control module may be configured to deny access to those data types for "sales" purposes after the sales process is complete.

The data and artifact manager 246 may be configured to track not only data saved in the data repository, but also to track who has used the data, and how it is used and/or transformed through the analytic process. So, the data and artifact manager 246 tracks, for example, not only the data itself, but analytic models and their resulting data, results of queries run on the data, and any other "artifacts" that may be generated based on the data, and in particular, identified personal data. Thereafter, when the time comes, for example, to either block access to certain data types or to delete certain data types for a given data subject(s), not only is the original data blocked or deleted, but the data and artifact manager 246 provides the ability to block or delete any "artifacts" of that data that may be generated throughout the processing lifecycle of the data. So, for example, if a user of the system performs a query, the result of which contains some personal data, such as, "provide the name and address of all those individuals who purchased a pair of shoes," if those results are stored, then this subsidiary use of the personal information returned in response to this query, would be tracked, and, for example, if this particular data had a three year retention period, this would permit these subsidiary uses to be identified at that time, so that this "subsidiary" data can be deleted, as well, such as by using the exemplary methods described above.

The consent monitoring and management module 248 may be used to store the various consents that have been provided for a given data type stored in the column-based storage provided in the data repository 250. So, for example, for the data type "Address" provided in the example above, the consent monitoring and management module 248 may store the "sales" consent associated with that data, so that it can be determined when access to that data is requested for a given purpose, whether consent exists for such a use. Additionally, this module may be configured to control access for certain purposes, while prohibiting access for unauthorized purposes, such as for purposes for which consent has not been given. So, for example, if the "sales" consent has been given for the "Address" data type, or if consent has only been given for pre-sale uses of a data subject's "Address" data, such as for the purposes of fulfilling an order, other purposes of the data may not be permitted.

The system may provide a query engine 260, such as "Hana Vora Query Engine", a fast in-memory data processing engine that may be provided to perform real-time analytics on data a distributing computing cluster, such as Apache Hadoop. Additionally, a data visualization library 270 may be provided to assist in formatting and or viewing the results of given queries. And, an ANSI SQL and Analytics module 280 may be provided that may be configured to provide support for processing SQL queries and or providing analytics for an authorized user and for authorized purposes.

For example, these query tools could be used, for example, in responding to a query regarding how many orders of particular brands of a product were sold in a given zip code. To respond to such a query, these modules could process user data stored in the data repository to provide that query result. However, in the example given above, if consent is only given to process Address data for purposes of fulfilling a data subject's order, this consent alone would not permit, e.g., use or access this data in responding to a query such as the "sales per zip code query" described above. Access to certain data subject's data stored in the data repository, such as in this case "Address" data having only a "pre-sale" consent, might be limited such that those data types could not be included in responding to such a query. In the given example, then, the consent monitoring and management module 248 may operate to prevent the Address data from being used for the requested purpose by the query and analytics modules, even if its use for other purposes might otherwise be permissible based on the current consent(s) provided for that data.

One additional benefit of the systems and methods of this disclosure is that they provide an improved ability for a data subject to withdraw her specific consent for one or more consent purposes, or to have her personal data deleted entirely. For example, in the case where a given user has, for example, become dissatisfied with the customer support she has been provided, she may want to have her personal data deleted entirely, while in another case, she perhaps no longer wishes to receive marketing emails, and so may only wish to revoke her consent for "marketing" purposes, while not actually having her data deleted entirely. Each of these modifications changes how this data subject's information will be treated, and each involves a consent revocation process, which is described further herein.

Consent revocation is facilitated by mapping consents to specific columns of data, which may be contained in the master data maintained for a given data subject. So, in the exemplary data set provided for user Joy Rayn, above, the DataSubject ID Ix231243 is associated with each of the data types for which the system has obtained Joy's consent to store her personal information. So, in the example given above, Joy may have initially provided consent for using her name, email address and phone number for marketing purposes, and her name, email address, phone number, address, and date of birth for sales purposes. In the case of requesting that her personal data be deleted, each of the data types containing personal data associated with Joy's DataSubject ID would need to be deleted from the data repository 250. If, however, Joy was merely revoking her marketing consent, the consent monitoring and management module 248 could function to remove her marketing consent identifier from the second parameter of those data fields to which it was previously added, in this case, the fields corresponding to name, email address and phone number. This limited withdrawal of consent, however, would not affect her "sales" consent for those fields, and would leave unchanged those fields containing personal data for which marketing consent was not provided in the first instance, namely address and date of birth. This approach provides significant advantages over a traditional data storage system that does not store data in a columnar storage format, as it cannot readily provide a facility for removing a single parameter for a single data type. As such, revocation instructions cannot be applied to one specific consent type applied to one column of personal data, while providing the ability to leave other columns of personal data—or other columns not containing personal data—unaffected.

Additionally, some cases may arise where a request to delete personal data has been received from a customer, but that may not be entirely permissible, such as due to an underlying legal obligation to maintain that data for a specified period. The present disclosure provides a facility for honoring such a request, while still complying with legal obligations. As discussed above, where Joy has withdrawn her consent for storage of her personal data for the purposes for which consent was originally given, such as for sales and marketing purposes, but where there is a legal obligation to maintain it for other purposes, such as for the purposes of a business maintaining proper tax records, the consents for, e.g., sales and marketing purposes might be removed, while the records required for tax purposes are maintained. To comply with the customer's request, however, access to those records that was previously permitted based on those consent types might be blocked, while the underlying data might still be maintained, e.g., for a required retention period set forth in a given jurisdiction. So, if the law in a given jurisdiction requires the storage of certain information, even personal information, for a period of five years, then such personal data could be retained for that period, while still blocking or masking access to the data for any other purpose, using the systems and methods described in more detail above.

The data repository 250 may comprise a meta-information repository 252, a file repository 254, a snapshot container 256, a recovery manager 257, an audit log 258, and a data format converter 259.

The meta-information repository 252 may store the information needed to interpret the data, including personal data that is to be received by the system and stored in the data repository. In some embodiments, an entity desiring to make use of the systems and methods described herein to manage data stored by, for example, an application running on their system, may subscribe to a service providing the functionality described herein to manage the data for that application. In some cases, the entity would, as part of the initial process of subscribing to such a service, or as part of downloading software providing the functionality described herein, be prompted to provide the meta-information required to model not only the type of information stored by the application, but how individual types of information are to be treated. So, for example, the user may specify in the stored meta-information what the "master data" for the particular application looks like, such as the fields that are used, the categorization of those fields (e.g., what kind of data is stored in those fields and/or do they comprise, e.g., personal information), to what business unit, or business domain those fields belong, the business processes that require access to those fields (e.g., order processing, billing, delivery, sales, marketing, financial accounting), the various purposes for which that data may be used, including any valid types of user "consent" that may be applied to stored personal data, such as those described in the examples above.

This meta-information can in turn be used by, e.g., an optional GDPR engine 290 to model the rules for how the various types of data having the various types of consent are to be treated. Thereafter, when the application receives information that is to be processed by the data manager 210 and stored in the data repository 250, the rules set forth for the data are applied based on the meta-information applicable to the data being received. Also stored therein would be the specific rules for dealing with particular types of data, which may be generated based on business needs or rules, regulations or restrictions put on storage and/or management of the data, e.g., personal data, by a given governing body, legal entity, or other entity, or for other purposes, as desired by the person or entity responsible for managing the data stored in the data repository 250.

This meta-information may be provided, for example, when a system or service is initially set up, and/or may be updated periodically over time or as needed to reflect, e.g., changes to the types of master data, changes to how those types of data are to be treated, such as when a business practice changes, or when changes occur to laws or regulation affecting how received data may be stored or managed, or for other reasons, as desired.

The file repository 254 is used to store the data being managed by the system. As described above, the data may be stored in a columnar format, or other format designed to provide for application of different consents and/or different data privacy controls for different types of data received from a data subject, as further described herein.

The snapshot container 256 may be provided to provide a replica of the data, either to serve as a backup or for other purposes as may be desired.

The recovery manager 257 may be provided to allow the data stored in the data repository to be tied to one or more prior version of a data set, such as in the event that a prior version needs to be restored, due to natural disaster, data corruption, system failure, or other reasons. This facility may be provided, in particular embodiments, by functionality enabled by HADOOP data recovery management.

The audit log 258 may be configured to store a log of changes made to the system and/or the stored data. For example, the system may track and log changes that may impact a data subject's personal data, including, without limitation, administrative actions such as adding, modifying, and removing database users, schema operations, other database operation and analytical data processing for providing records of processing of data from the time of its creation to its erasure to data controller and law enforcement authority.

The data format converter 259 permits for conversion of data stored, e.g., in the parquet file format or other column-based data storage format that may be used with the systems and methods herein, into another format which may be used for other purposes, as desired. For example, the converter could facilitate exporting the data into a CS3 format. Additionally, in some cases, it may be either desirable or required to provide a customer with her own stored information upon request. This facility may permit such data to be downloaded into another format which may be accessible by the customer. Additionally, in some cases, it may be desirable to transform the data into another format for the purpose of further processing the data such as for query or other analytical purposes, as desired. Finally, over the period of the lifecycle during which data is stored in the data repository, the format in which data is stored may change, and the converter may provide functionality for converting data into a different format. One example would be that i data is stored in two-digit format, but over time additional digits are necessary, this converter could convert data stored using the old two-digit format into a new format with, e.g., four digits, as was required for many systems operating in the year 2000 that had been put into place in the early to mid-1900s. Additionally, the converter may operate to apply meta-information for different time periods to different sets of data. For example, one set of meta-information may apply to data entering the system in the period from 2010 to 2020, while a different set of meta-information may apply to data entering the system after 2020, such as when additional fields are added, for example. So, the data format converter 259 may permit a data set comprising data entries from time periods governed by different sets of meta-information to be standardized to reflect the most current meta-information applicable to a given data set, or, in certain instances, to ensure that data received by the system at a given time is treated in accordance with the set of meta-information applicable at that time.

In some examples, a GDPR engine 290 may also be provided to comply with requirements of the GDPR, such as complying with reporting obligations, or responding to a request from a data subject for her individual personal information, or other services as may be required, leveraging the other systems for storage and management of that information, as further described herein.

Example Environment for Implementing Consent-Based Data Privacy Management

Figure 3:
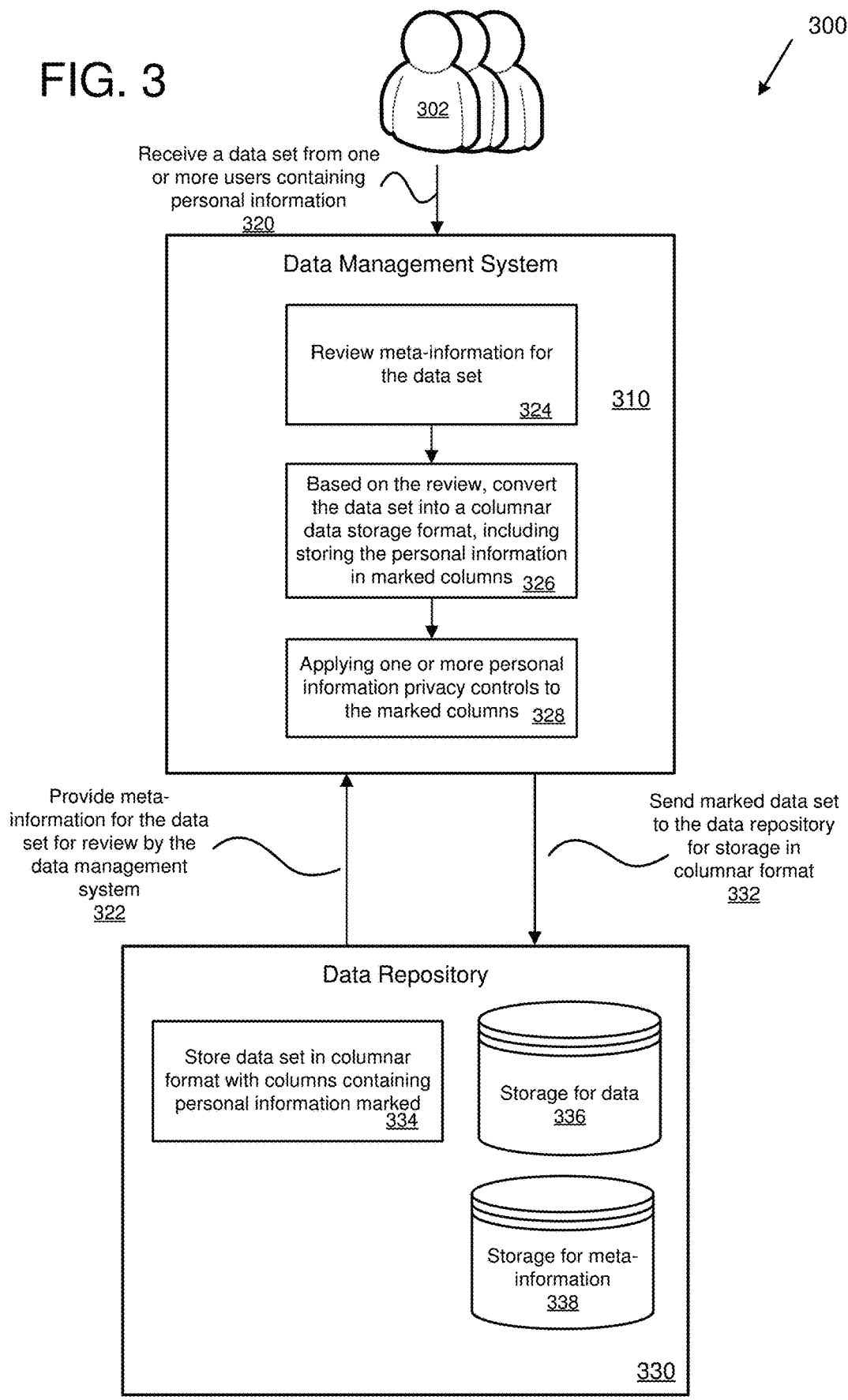
FIG. 3 is a diagram depicting an example environment for implementing consent-based data privacy management.

FIG. 3 is a diagram depicting an example environment 300 for implementing consent-based data privacy management. In the example environment 300, a data management system 310 may receive data from one or more users 302, which then may be stored in a data repository 330. The data management system 310 can include computing devices (e.g., server computers, desktop computers, database systems, and/or other types of computing devices) and/or software resources supporting the receipt, storage, management, and deletion of data, particularly data that includes personal information.

As depicted at 320, a data set containing personal information may be received from one or more users 302 by the data management system 310.

As depicted at 322, meta-information for the data set may be provided for review by the data management system 310. This meta-information may be stored in the data repository 330, e.g., in meta-information storage 338.

As depicted at 324, once the data set and meta-information have been provided to the data management system, the meta-information for the data set is reviewed.

As depicted at 326, based on this review of the meta-information, the data is converted into a columnar storage format, with one or more columns containing personal information being marked. This marking of columns may be performed using personal information identifiers, and in some embodiments, may further comprise marking the fields with specific consent types and/or legal entity information, as further described above.

As depicted at 328, one or more personal information privacy controls is applied to the marked columns.

As depicted at 332, the marked data set is sent to the data repository 330, where, as depicted at 334, it may be stored in data storage 336 in columnar format, with column containing personal information marked. As noted, one or more personal information privacy controls is applied to the marked columns.

While in this embodiment, personal privacy controls are shown as being applied within the data management system 310 prior to sending the data set to the data repository 330, it is to be understood that personal privacy controls, such as encryption, as well as the other data privacy controls described herein may be performed later, e.g., within the data repository 330, or as information is being received from the data repository, such as in the case of a subsequent request for data from (e.g., a query of) the data set.

Another Example Method for Consent-Based Data Privacy Management

Figure 4:
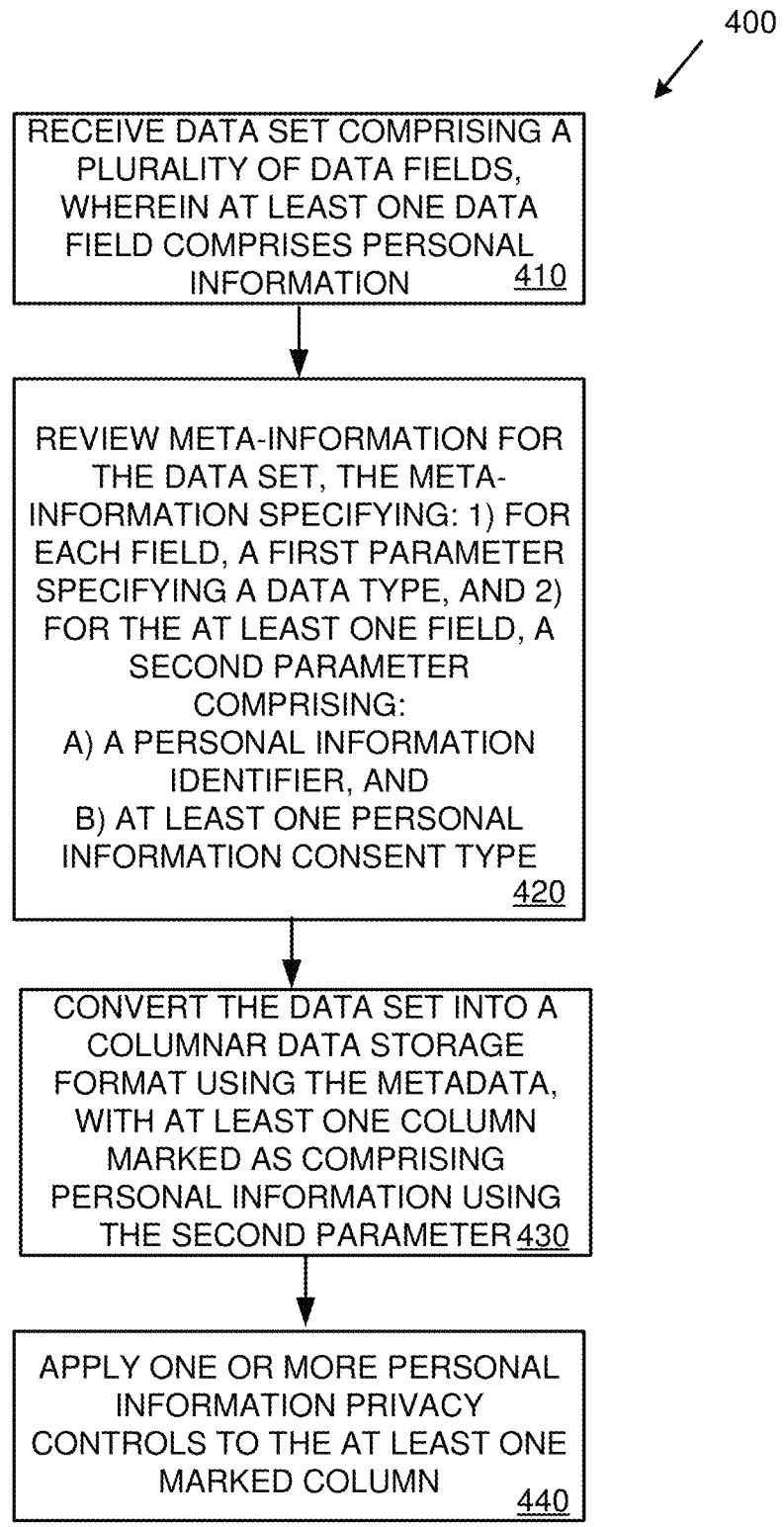
FIG. 4 is a flowchart of another example method for implementing consent-based data privacy management.

FIG. 4 is a flowchart of another example method 400 for consent-based data privacy management. The example method 400 can be performed, at least in part, by a computing device.

At 410, a data set is received that contains a plurality of data fields, wherein at least one data field comprises personal information. It is understood that additional data may fields may also be received, which either do or do not contain personal information At 420, meta-information for the data set is reviewed, the meta-information specifying: 1) for each field, a first parameter specifying a data type, and 2) for the at least one field comprising personal information, also specifying a) a personal information identifier, and b) at least one personal information consent type. The meta-information may be similar to the exemplary meta-information set forth above, or may contain other or additional identifiers.

At 430, the data set is converted into a columnar data storage format using the meta-information, and at least one column is marked as comprising personal information using the second parameter. For example, a given column may be marked with a personal data identifier. Additionally, a given column may be marked with one or more consent identifiers identifying specific consents provided by a data subject for their personal data. Additionally, a given column may be marked with one or more legal entity identifiers identifying specific legal entities governing consents for a given data type and/or for a given data subject. In some embodiments, the conversion may be performed using a micro-service Parquet writer to convert the data into Parquet file format. In particular embodiments, the data may be stored in business object relationship format. As further described herein, the Parquet writer may make use of "PII identifier" and "consent monitoring and management" modules for personal data marking.

An exemplary data model such as that set forth above may be used to store data so that the one or more columns comprising personal information may be marked, including being marked with one or both of the first and second parameter, or other or additional marking schemes may be used.

At 440, one or more personal information privacy controls are applied to the at least one marked column. Exemplary privacy controls are discussed in more detail herein, and may include, for example, and without limitation:

encrypting the data, masking the data, blocking access to the data, and/or deleting the data, or otherwise restricting access, including as described herein. Again, because data is stored in a columnar format, these privacy controls can be applied to individual data types based on their specific consents associated therewith, rather than at a file level, which in some cases either may not comply with legal entity requirements or may unduly limit access to certain types of information, or both.

Figure 5:
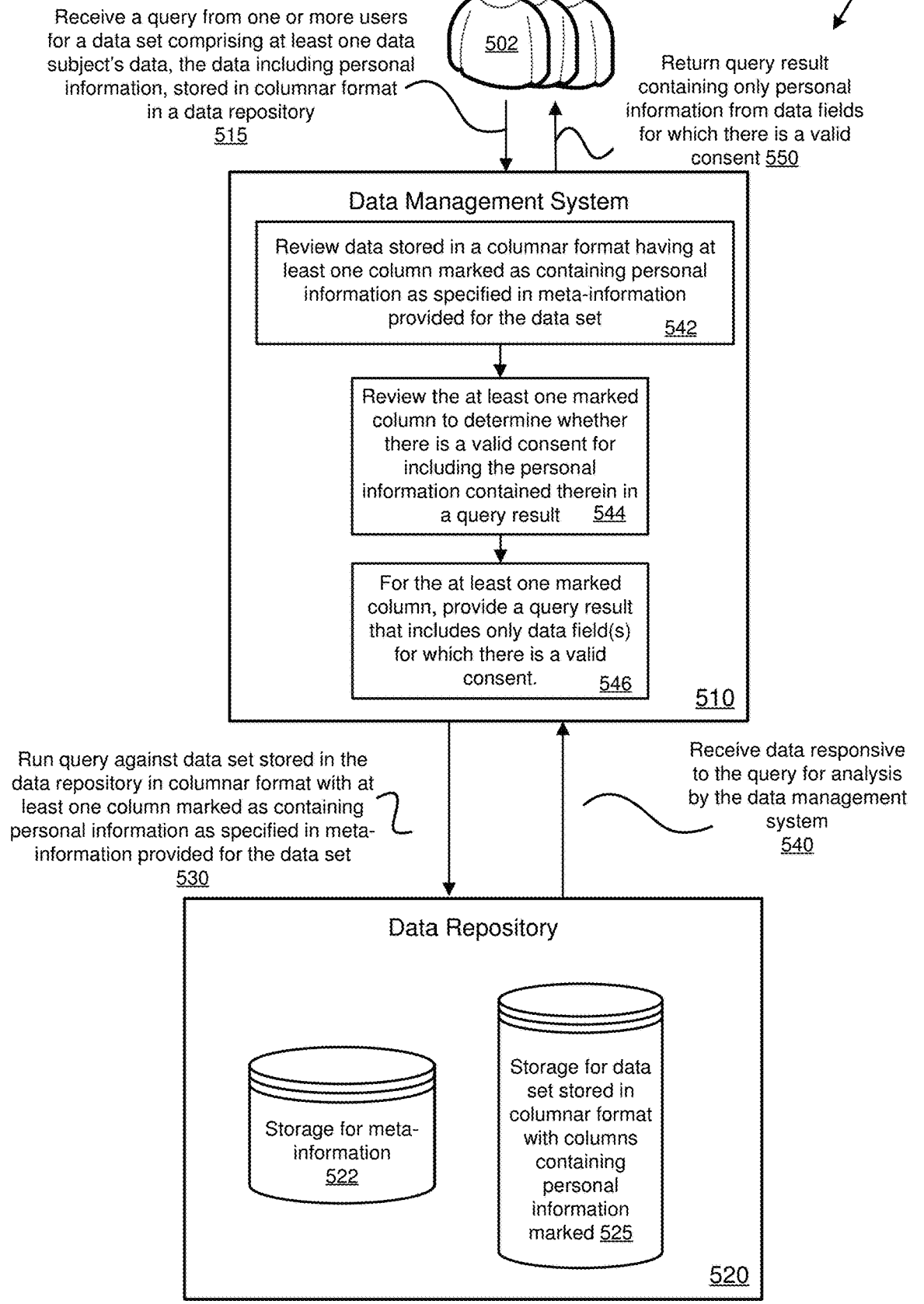
FIG. 5 is a diagram depicting another example environment for implementing consent-based data privacy management.

Another Example Environment for Implementing Consent-Based Data Privacy Management FIG. 5 is a diagram depicting another example environment 500 for implementing consent-based data privacy management. In the example environment 500, a data management system 510 may receive a query request from one or more users 502 for a data subject's data stored in columnar format in a data repository 520.

As depicted at 515, the data management system 510 receives a query from one or more users for a data set comprising at least one data subject's data, the data including the data subject's personal information, stored in columnar format in a data repository 520.

As depicted at 530, the data management system 515 runs the query against data set stored in the data repository in columnar format with at least one column marked as containing personal information as specified in meta-information provided for the data set. As illustrated, the data set may be stored in data set storage 525 in the data repository 520, and may be stored in columnar format with columns containing personal information marked. As illustrated, the meta-information may be stored in the data repository 520 in meta-information storage 522.

As depicted at 540, the data responsive to the query is received for analysis by the data management system 510.

As depicted at 542, the data set stored in a columnar format having at least one column marked as containing personal information as specified in meta-information provided for the data set is reviewed by the data management system.

As depicted at 544, the at least one marked column is reviewed to determine whether there is a valid consent for including the personal information contained therein in a query result.

As depicted at 546, for the at least one marked column, a query result is provided that includes only data field(s) for which there is a valid consent. This may include providing a plurality of data fields if there are multiple marked columns for which valid consent has been provided, or no data fields, if no such columns exist having a valid consent.

As depicted at 550, a query result is returned to the one or more users 502 containing only personal information from data fields for which there is a valid consent.

Another Example Method for Consent-Based Data Privacy Management

Figure 6:
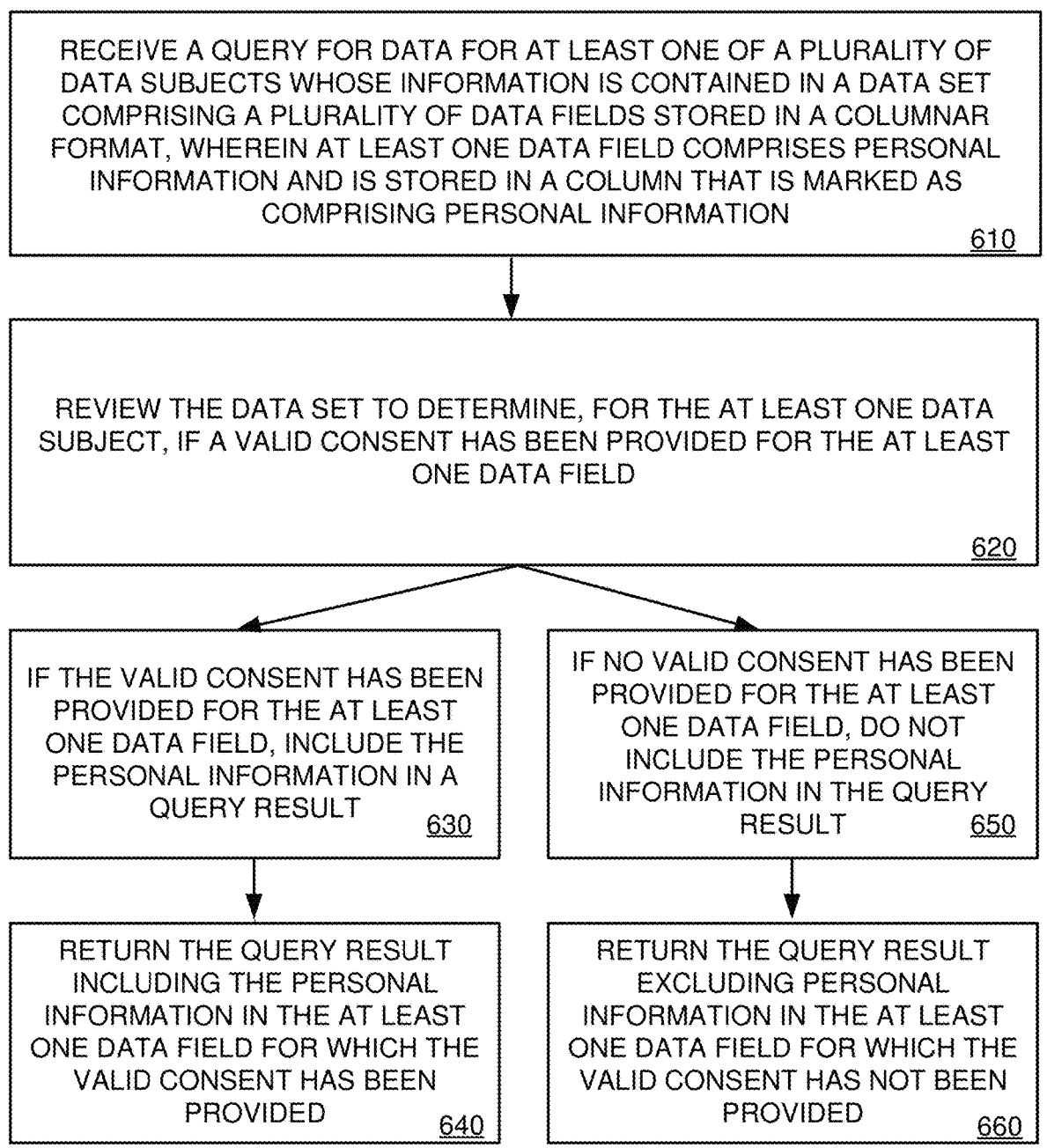
FIG. 6 is a flowchart of another example method for implementing consent-based data privacy management.

FIG. 6 is a flowchart of another example method 600 for consent-based data privacy management. The example method 600 can be performed, at least in part, by a computing device.

At 610, a query is received for data for at least one of a plurality of data subjects whose information is contained in a data set comprising a plurality of data fields stored in a columnar format, wherein at least one data field comprises personal information and is stored in a column that is marked as comprising personal information.

At 620, the data set is reviewed to determine, for the at least one data subject, if a valid consent has been provided for the at least one data field marked as containing personal information.

At 630, if the valid consent has been provided for the at least one data field marked as containing personal information, the personal information is included in a query result, and at 640, the query result containing the personal information is returned.

At 650, if the valid consent has not been provided for the at least one data field marked as containing personal information, the personal information is not included in a query result, and at 660, the query result is returned, excluding the personal information for which valid consent was not provided.

In other implementations, other instrumentalities or techniques can be employed to provide consent-based data privacy management of personal information.

Computing Systems

Figure 7:
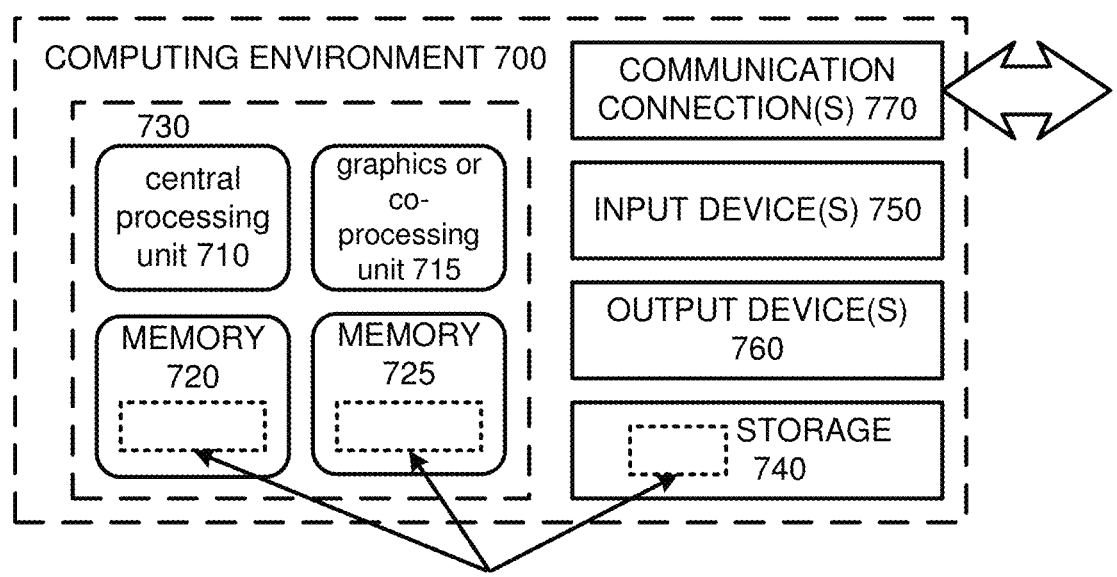
FIG. 7 is a diagram of an example computing system in which some described embodiments can be implemented.

FIG. 7 depicts a generalized example of a suitable computing system 700 in which the described technologies may be implemented. The computing system 700 is not intended to suggest any limitation as to scope of use or functionality, as the technologies may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more technologies described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more technologies described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 8:
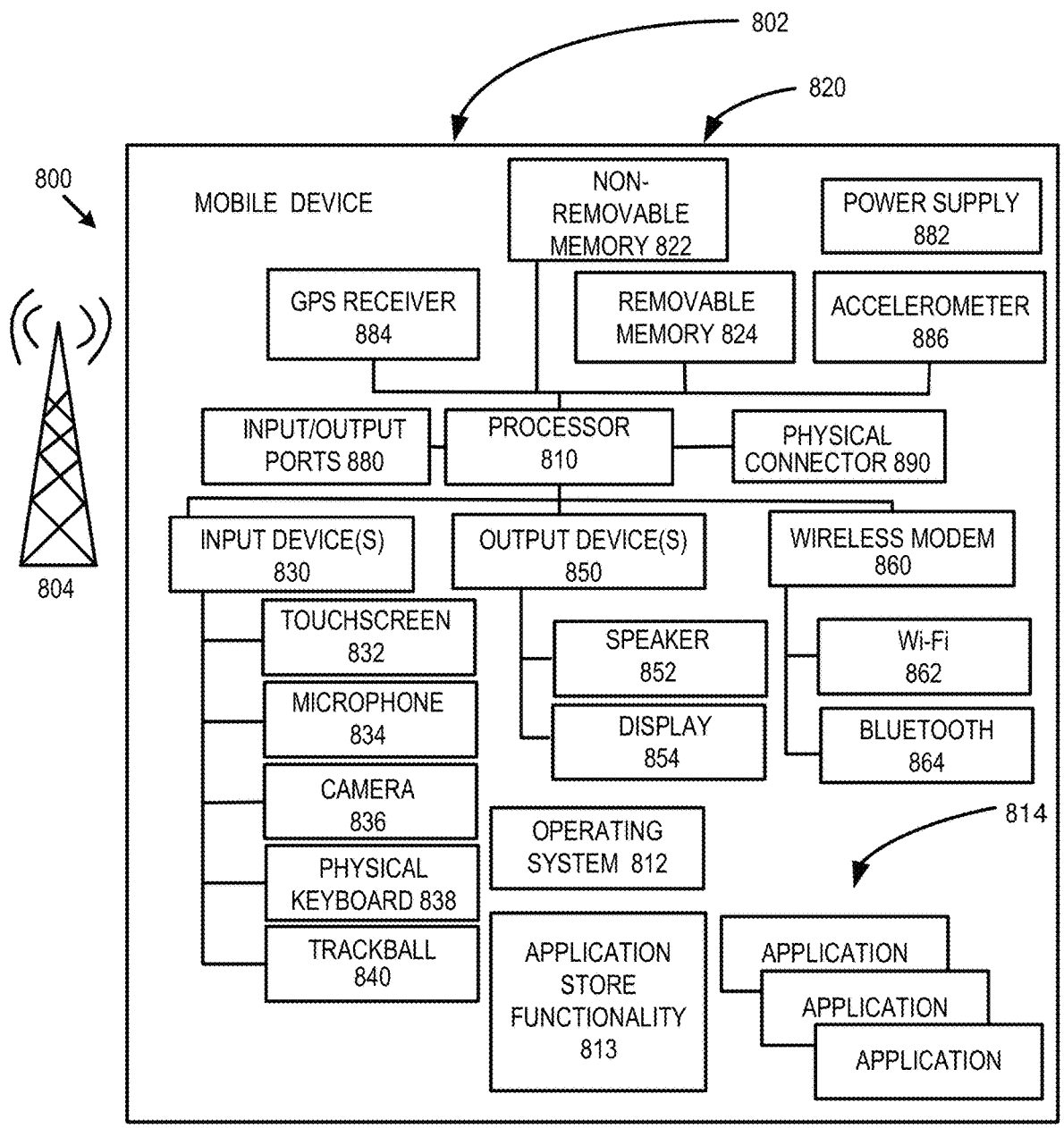
FIG. 8 is an example mobile device that can be used in conjunction with the technologies described herein.

FIG. 8 is a system diagram depicting an example mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular, satellite, or other network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications), or any other computing application. Functionality 813 for accessing an application store can also be used for acquiring and updating application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device.

The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be deleted, and other components can be added.

Cloud-Supported Environment

Figure 9:
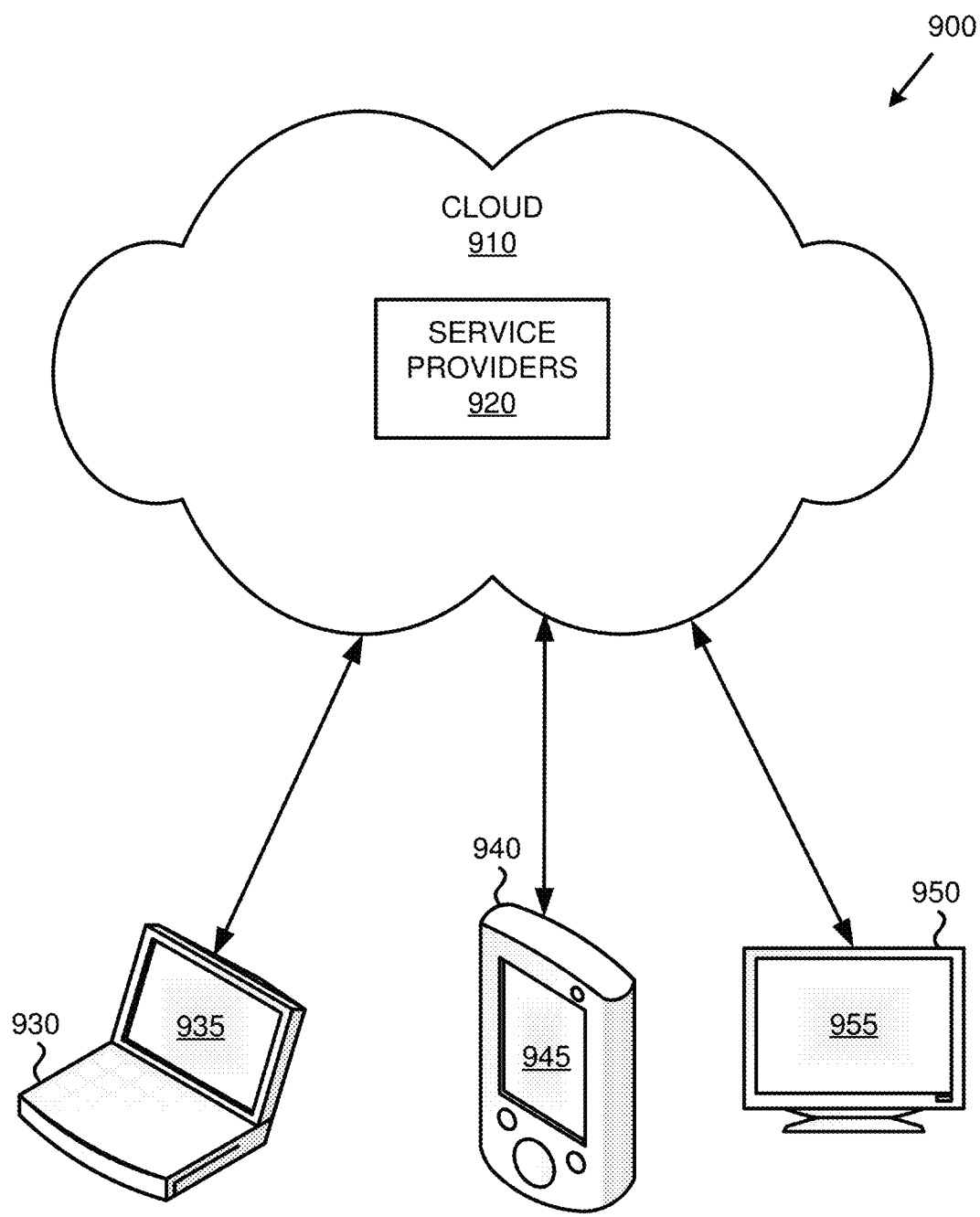
FIG. 9 is an example cloud-support environment that can be used in conjunction with the technologies described herein.

FIG. 9 illustrates a generalized example of a suitable cloud-supported environment 900 in which described embodiments, techniques, and technologies may be implemented. In the example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, and the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. By way of example and with reference to FIG. 8, computer-readable storage media include memory and storage 820, 822, and 824. The term computer-readable storage media does not include signals and carrier waves. In addition, the term computer-readable storage media does not include communication connections, such as 770, 860, 862, and 864.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the invention is defined by the following claims. We therefore claim as our invention all that comes within the scope and spirit of these claims.

We claim:

1. A computer-implemented method comprising:
   receiving a data set comprising a plurality of data fields, wherein at least two data fields comprise personal information, and further wherein at least one data field does not comprise personal information;
   reviewing meta-information for the data set, the meta-information comprising a categorization for the plurality of fields, the categorization comprising, for each of the plurality of fields:
      a first parameter specifying field data type, and
      for fields comprising personal information, a second parameter specifying personal data consent information;
   converting the first data set into a columnar data storage format using the meta-information, wherein converting the first data set further comprises storing each of the at least two data fields comprising personal information in separate columns, each column marked as comprising personal information; and
   applying at least one personal information privacy control to the marked columns, wherein applying the at least one personal privacy control comprises reviewing a data subject consent table comprising, for each of the marked columns:
   a data subject ID for a data subject;
   at least one data type specifying the data subject's personal information stored in the marked column for which the data subject has given a valid consent; and
   for the at least one data type for which the data subject has given a valid consent, at least one usage purpose for which the data subject has given consent;
   wherein the meta-information further comprises a rule table comprising:
      at least one consent purpose;
      at least one legal entity governing the at least one consent purpose; and
      a retention period for the at least one consent purpose, the retention period indicating a period after which personal information for a data subject stored in at least one of the marked columns and specifying the at least one consent purpose may be deleted;
   the method further comprising:
      permitting access to the data subject's personal information stored in a first of the marked columns for the at least one data type for which the data subject has given a valid consent for the at least one usage purpose, and
      denying access to the data subject's personal information stored in a second of the marked columns for at least one data type for which the data subject has not given a valid consent for the at least one usage purpose.

2. The computer-implemented method of claim 1, wherein applying the at least one personal information privacy control comprises applying at least one of the following:
   data encryption;
   data masking;
   access control management; or
   recovery management.

3. The computer-implemented method of claim 1, wherein applying the at least one personal information privacy control comprises applying data encryption to at least one of the marked columns.

4. The computer-implemented method of claim 1, wherein applying the at least one personal information privacy control comprises:
   determining whether there is a valid consent for at least one of the marked columns; and
   applying data masking to the at least one of the marked columns, comprising:
      making the contents of the at least one of the marked columns accessible for at least one purpose for which there is a valid consent; and
      making the contents of the at least one of the marked columns inaccessible for at least one purpose for which there is no valid consent.

5. The computer-implemented method of claim 1, wherein applying the at least one personal information privacy control comprises:
   determining whether there is a valid consent for at least one of the marked columns;
   permitting access to the at least one of the marked columns for a usage purpose for which there is a valid consent; and
   denying access to the at least one of the marked columns for a usage purpose for which there is no valid consent.

6. The computer-implemented method of claim 1, wherein applying the at least one personal information privacy control comprises reviewing a legal entity table comprising:
   a data subject ID for a data subject;
   at least one consent purpose for the data subject's personal information stored in at least one of the marked columns which the data subject has given consent; and
   at least one legal entity governing the at least one consent purpose;

the method further comprising permitting access to the data subject's personal information stored in the at least one of the marked columns for the at least one consent purpose.

7. The computer-implemented method of claim 1, wherein the rule table further comprises:
a blocking period for the at least one consent purpose, the blocking period indicating a period after which access for the at least one consent purpose to personal information for a data subject stored in the at least one of the marked columns may be blocked.

8. The computer-implemented method of claim 1, wherein the second parameter comprises:
a personal information identifier, and
at least one personal information consent type identifying a usage purpose for the personal information.

9. The computer-implemented method of claim 8, wherein the at least one personal information consent type is associated with a first category of consent having a plurality of consent sub-categories, and wherein each of the sub-categories has a different consent sub-type.

10. A computing system comprising:
one or more memories;
one or more processors coupled to the one or more memories; and
one or more non-transitory computer readable storage media storing instructions that, when executed, cause the one or more processors to perform the following operations:
receive a data set comprising a plurality of data fields, each having a plurality of entries, wherein at least two data fields comprise personal information, and further wherein at least one data field does not comprise personal information;
review meta-information for the data set, the meta-information comprising a categorization for the plurality of fields, the categorization comprising, for each of the plurality of fields:
a first parameter specifying a data type, and
for fields comprising personal information, a second parameter specifying personal information consent information, the second parameter comprising:
a personal information identifier, and
at least one personal information consent type specifying a usage purpose for which a data subject may provide consent, wherein a first of the at least two data fields has a usage purpose that is different from a second of the at least two data fields;
convert the first data set into a columnar data storage format using the meta-information, wherein converting the first data set further comprises storing the plurality of entries for each of the at least two data fields comprising personal information in separate columns, each column marked with the personal information identifier; and
apply at least one personal information privacy control to at least one column marked with the personal information identifier for which consent for a specific usage purpose has been given, while not applying the personal information privacy control to a second column for which consent for the specific usage purpose has not been given, wherein applying the at least one personal privacy control further comprises deleting the personal information.

11. The computing system of claim 10, wherein applying the at least one personal privacy control comprises limiting access to personal information stored in the at least one marked column to which the personal privacy control is applied for at least one of the plurality of entries for which the data subject has not provided a valid consent for the at least one personal information consent type.

12. The computing system of claim 10, wherein deleting the personal information comprises automatically deleting the personal information upon the expiration of a retention period.

13. The computing system of claim 10, wherein applying the at least one personal privacy control comprises tracking at least one authorized usage of personal information stored in the at least one marked column to which the personal privacy control is applied that results in a copy of the personal information being accessed or stored outside the at least one marked column to which the personal privacy control is applied.

14. The computing system of claim 13, wherein applying the at least one personal privacy control further comprises deleting the personal information stored in the at least one marked column to which the personal privacy control is applied, as well as a copy of the personal information stored outside the at least one marked column to which the personal privacy control is applied.

15. A computer-implemented method comprising:
receiving a query for data for at least one of a plurality of data subjects, wherein the data comprises a plurality of data fields stored in a columnar format, and wherein at least two data fields are each stored in separate columns that are each marked as comprising personal information;
reviewing the data set to determine, for the at least one data subject, if a valid consent has been provided for the personal information stored in the marked columns;
determining whether the valid consent has been provided for the at least one data subject, wherein determining whether the valid consent has been provided for the at least one data subject further comprises:
determining a blocking period for the personal information stored in the marked column for which the data subject has given consent,
determining if the blocking period has expired; and
if the blocking period has expired, determining that the valid consent has not been provided, and
for at least one column for which the valid consent has been provided:
include the personal information in a query result, and
return the query result including the personal information stored in the at least one marked column for which the valid consent has been provided; and
for at least one column for which the valid consent has not been provided:
do not include the personal information in a query result, and
return the query result excluding the personal information stored in the at least one marked column for which the valid consent has been provided.

16. The computer-implemented method of claim 15, wherein determining whether the valid consent has been provided for the at least one data subject comprises:

reviewing a data subject consent table comprising:
- a data subject ID for the data subject;
- at least one data type specifying the data subject's personal information stored in the at least one marked column for which the data subject has given a valid consent; and
- for the at least one data type for which the data subject has given a valid consent, at least one purpose for which the data subject has given consent; and determining whether a purpose for the query matches the at least one purpose for which the data subject has given consent.

\* \* \* \* \*